United States Patent [19]
Loewe

[11] Patent Number: 5,414,897
[45] Date of Patent: May 16, 1995

[54] HINGE MECHANISM FOR A VEHICULAR SEAT BACK

[75] Inventor: Gerhard Loewe, Battle Creek, Mich.

[73] Assignee: Atwood Automotive, Inc., Battle Creek, Mich.

[21] Appl. No.: 167,774

[22] Filed: Dec. 15, 1993

[51] Int. Cl.⁶ .............................................. E05D 11/10
[52] U.S. Cl. ...................................................... 16/325
[58] Field of Search ................ 16/325, 324, 333, 354; 297/362, 398

[56] References Cited

U.S. PATENT DOCUMENTS

| | | |
|---|---|---|
| 4,223,947 | 9/1980 | Cremer ........................ 16/325 |
| 4,227,741 | 10/1980 | Gross et al. ...................... 16/325 |
| 5,058,240 | 10/1991 | Barda et al. ..................... 16/333 |
| 5,138,744 | 8/1992 | Coggon ........................ 16/325 |

OTHER PUBLICATIONS

Drawing bearing the date stamp "Michael C. Payden—Aug. 17, 1993" and showing a recliner which is prior art under 35 U.S.C. §102(b).

*Primary Examiner*—P. Austin Bradley
*Assistant Examiner*—Chuck Y. Mah
*Attorney, Agent, or Firm*—Leydig, Voit & Mayer, Ltd.

[57] ABSTRACT

A hinge arm adapted to be attached to a vehicular seat back is pivotally connected to a bracket adapted to be attached to the seat cushion and normally is held in a fixed position by virtue of a pivoted latch on the arm engaging a fixed latch plate on the bracket. The latch and the latch plate are formed with engageable latching faces which cause a heel on the latch to wedge into a pocket in the latch plate and prevent chucking of the seat back. The latching faces are curved on different radii and about different centers in order to maintain tight engagement between the two latching faces and to keep the heel wedged into the pocket as the latching faces wear.

9 Claims, 1 Drawing Sheet

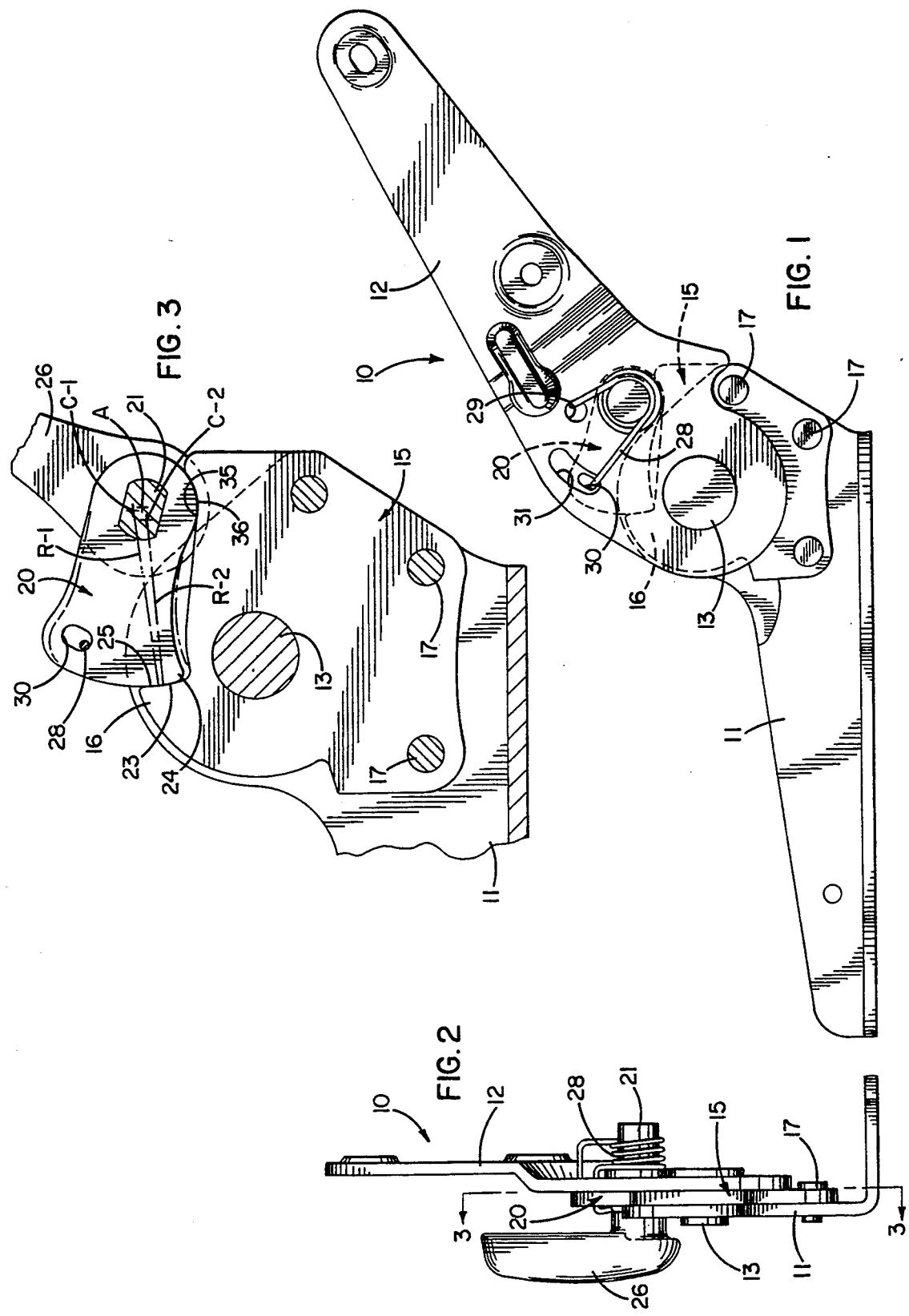

HINGE MECHANISM FOR A VEHICULAR SEAT BACK

BACKGROUND OF THE INVENTION

This invention relates generally to a hinge mechanism for pivotally supporting a vehicular seat back for forward and rearward tilting relative to the seat cushion. More particularly, the invention relates to a hinge having one member which carries a pivoted latch that normally engages a latch plate on the other hinge member to hold the seat back in a fixed position relative to the cushion. When the latch is released from the latch plate by a pivotal motion, the seat back may be tilted forwardly to facilitate entry into or exit from the vehicle by a rear seat passenger or to facilitate access to a rear cargo area.

In prior hinge mechanisms of the above type, the latch plate is formed with a tooth having a curved latching face which is engaged by a similarly but reversely curved latching face on the nose of the latch. An adjustable eccentric is provided to keep the latching faces in tight engagement and prevent front-rear chucking of the seat back relative to the seat cushion. As the latching faces wear, the eccentric must be adjusted to keep the faces in tight engagement.

The eccentric used in prior hinges not only adds to the cost of manufacturing and assembling the hinge but also requires periodic adjustment to prevent chucking. Such adjustment is time consuming and, if not performed on a regular basis, results in a loose vibratory connection between the seat back and cushion. Even if the adjustment is made on a regular basis, some chucking can occur as the parts wear and before the adjustment is effected.

SUMMARY OF THE INVENTION

The general aim of the present invention is to provide a new and improved seat back hinge in which the latch and the latch plate are uniquely constructed to eliminate the need for an adjusting eccentric or the like and, at the same time, automatically self-compensate and remain in virtually chuck-free engagement as wear occurs.

A more detailed object of the invention is to achieve the foregoing by providing a hinge in which the latch includes a heel which is wedged tightly against the latch plate as the nose of the latch moves into engagement with the tooth of the latch plate, such wedging keeping the latch and the latch plate rigidly together so as to prevent chucking.

A related object is to form the latching faces of the latch nose and the latch plate tooth with self-compensating curvatures causing the latching faces to remain in engagement with one another and causing the heel of the latch to remain in wedging engagement with the latch plate as the latching faces wear.

These and other objects and advantages of the invention will become more apparent from the following detailed description when taken in conjunction with the accompanying drawings.

BRIEF DESCRIPTION OF THE DRAWINGS

FIG. 1 is a side elevational view of a new and improved seat back hinge incorporating the unique features of the present invention.

FIG. 2 is a front elevational view of the hinge.

FIG. 3 is an enlarged fragmentary cross-section taken substantially along the line 3—3 of FIG. 2.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the invention has been shown in the drawings as embodied in a hinge mechanism 10 which is particularly useful for connecting a vehicular seat back for forward tilting relative to a seat cushion. The hinge 10 includes a fixed member or bracket 11 adapted to be fixed securely to the lower portion of the seat cushion frame and further includes a movable member or arm 12 adapted to be secured rigidly to the seat back frame. The arm 12 is pivotally connected to the bracket 11 to swing forwardly and rearwardly about a laterally extending and generally horizontal axis by a rivet 13 or other pivot element.

The arm 12 normally is latched in a rear position relative to the bracket 11 (see FIG. 1) and is adapted to be released from the bracket and swung forwardly to facilitate passenger entry to and exit from the rear seat of the vehicle to facilitate access to a rear cargo area. In order to latch the arm, a latching plate 15 (FIG. 3) with a generally radially extending tooth 16 is fixed rigidly to the bracket 11 by rivets 17. A latch 20 is pivotally attached to the arm 12 by a pivot element 21 to swing about a laterally extending and generally horizontal axis A between latched and released positions, the axis A being located at the geometric center of the pivot element.

When the latch 20 is in its latched position shown in FIG. 3, an arcuately and convexly curved latching face 23 on a forward nose 24 of the latch engages an arcuately and concavely curved latching face 25 on the tooth 16 of the latch plate 15 to prevent forward swinging of the arm 12. That portion of the pivot element 21 that extends through the latch is of double-D shape and is fixed rigidly to the latch while the remainder of the pivot element is cylindrical and is journaled in the arm 12. When a knob 26 (FIGS. 2 and 3) attached to the outboard end of the pivot element is actuated manually, the latch 20 is swung clockwise from the latched position of FIGS. 1 and 3 to a released position in which the nose 24 clears the tooth 23 to permit forward tilting of the arm 12 and the attached seat back. Upon release of the handle, a torsion spring 28 returns the latch in a counterclockwise direction to cause the latching face 23 of the nose 24 to seat against the latching face 25 of the tooth 16 and restrict forward swinging of the arm. The spring encircles the pivot element 21, has one end secured within a hole 29 (FIG. 1) in the arm and has an opposite end secured within a hole 30 in the latch and movable within an elongated slot 31 in the arm.

After the arm 12 has been swung through repeated cycles, wear occurs at the latching face 23 of the nose 24 and the latching face 25 of the tooth 16 by virtue of the latching face 23 sliding against the latching face 25 during movement of the latch 20 between its latched and released positions. Unless the two latching faces are kept in intimate surface contact, the arm 12 eventually will start to chuck (i.e., vibrate back and forth) relative to the bracket 11 and thereby create rattles as well as undesirable movement of the seat back relative to the seat cushion.

In accordance with the present invention, the latch plate 15 and the latch 20 are constructed to wedge against one another to hold the latching face 23 tightly against the latching face 25. In addition, the faces 23 and 25 are shaped such that, as wear occurs, they self-compensate to remain in tight engagement with one another and to keep the latch in tight wedging engagement with the latch plate. As a result, the hinge arm 12 is kept in virtually chuck-free relation with the bracket 11 over the entire service life of the hinge 10 and without need of making any manual adjustments to maintain that relation.

More specifically, the upper rear portion of the latch plate 15 is formed with a pocket defined by a concave surface 35 which is curved arcuately about a center lying on the axis A. In addition, the lower rear portion of the latch 20 is formed with a heel defined by a convex surface 36 which is curved arcuately about the same center. When the latching face 23 of the nose 24 moves into engagement with the latching face 25 of the tooth 16, the force created by such engagement is directed so as to cause the heel 36 to wedge into the pocket 35. As a result, the latch 20 becomes trapped between two surfaces 25, 35 of the latch plate 15 so as to releasably lock the latch and the latch plate together as a rigid unit and prevent any relative movement therebetween.

Pursuant to the invention, the latching faces 23 and 25 are shaped so as to keep the heel 36 in wedging engagement with the pocket 35 even as the latching faces wear. For this purpose, both latching faces are curved about different centers which lie on different axes spaced from and extending parallel to the pivot axis A of the latch 20. As shown in FIG. 3, the concave latch face 25 of the tooth 16 is curved arcuately about a center C-1 which is spaced above and forwardly of the axis A. The convex latch face 23 of the nose 24 is curved arcuately about a different center C-2 which is spaced just slightly forwardly of the center C-1 and which is spaced below the axis A by a distance somewhat greater than the vertical spacing between the center C-1 and the axis. In one particular example, the latching face 25 is curved on a radius R-1 of about 38.65 mm. struck about a center C-1 spaced 0.32 mm. in front of the axis A and 2.00 mm. above the axis. The latching face 23 is curved on a radius R-2 of approximately 35.85 mm. struck about a center C-2 located about 2.40 mm. in front of the axis A and 1.80 mm. below the axis.

As the latching faces 23 and 25 wear, the nose 24 tends to drop deeper into the tooth 16 as indicated by the phantom lines in FIG. 3. Because of the different curvatures R-1 and R-2 of the latching faces 25 and 23 and because such faces are curved about different centers C-1 and C-2, respectively, the latching face 23 remains in mating surface contact with the latching face 25 as wear occurs and as the nose 24 drops deeper into the tooth 16. By virtue thereof, the heel 36 continues to be wedged into the pocket 35 so as to lock the latch 20 and latch plate 15 rigidly together as a unit and prevent chucking of the hinge arm 12. This is achieved without the expense of any components other than the latch and latch plate themselves and without need of making any manual adjustments as the components wear.

I claim:

1. A mechanism for supporting a vehicular seat back for forward and rearward pivoting relative to a seat cushion and for selectively holding the back in a fixed angular position relative to the cushion, said mechanism comprising first and second members adapted to be fixed relative to said seat back and said seat cushion, respectively, means pivotally interconnecting said members and supporting said first member to swing forwardly and rearwardly relative to said second member, a latch plate fixed to one of said members, a latch supported by the other of said members for pivotal movement about a first generally horizontal axis between latched and released positions relative to said one member, said latch plate having a tooth with a curved latching face, said latch having a nose with a curved latching face, the latching face of said nose engaging and mating with the latching face of said tooth and preventing forward pivoting of said first member relative to said second member when said latch is in said latched position, said mechanism being characterized in that the latching face of said nose and the latching face of said tooth are curved about first and second different centers, respectively, lying on two different axes spaced from and extending generally parallel to said first axis, a curved surface on said latch adjacent the end thereof opposite said nose, and a curved surface on said latch plate, said curved surface of said latch wedging against said curved surface of said latch plate when said latch is in said latched position and coacting with said latching faces to prevent chucking of said first member relative to said second member.

2. The mechanism as defined in claim 1 in which said latch is pivotally supported by said first member and in which said latch plate is fixed to said second member, said latching face of said tooth being arcuately concave, said latching face of said nose being arcuately convex.

3. The mechanism as defined in claim 2 in which said curved surfaces on said latch plate and said latch are concave and convex, respectively.

4. A mechanism for supporting a vehicular seat back for forward and rearward pivoting relative to a seat cushion and for selectively holding the back in a fixed angular position relative to the cushion, said mechanism comprising first and second members adapted to be fixed relative to said seat back and said seat cushion, respectively, means pivotally interconnecting said members and supporting said first member to swing forwardly and rearwardly relative to said second member, a latch plate fixed to second member, a latch supported by said first member for pivotal movement about a first generally horizontal axis between latched and released positions relative to said second member, said latch plate having a tooth with an arcuately curved concave latching face, said latch having a nose with an arcuately curved convex latching face, the latching face of said nose engaging the latching face of said tooth and preventing forward pivoting of said first member relative to said second member when said latch is in said latched position, said mechanism being characterized in that the latching face of said nose and the latching face of said tooth are curved about first and second different centers, respectively, lying on two different axes spaced from and extending generally parallel to said first axis, a convex heel on said latch adjacent the end thereof opposite said nose, and a concave pocket in said latch plate, said heel wedging into said pocket when said latch is in said latched position and coacting with said latching faces to prevent chucking of said first member relative to said second member.

5. The mechanism as defined in claim 4 in which said first and second centers are located on opposite sides of said first axis.

6. The mechanism as defined in claim 5 in which said first and second centers are spaced forwardly of said first axis.

7. The mechanism as defined in claim 6 in which said first center is spaced a predetermined distance below said first axis, said second center being spaced a lesser distance above said first axis.

8. The mechanism as defined in claim 7 in which said first center is spaced forwardly of said first axis by a greater distance than said second center.

9. The mechanism as defined in claim 4 in which said heel and said pocket have mating convex and concave curvatures, respectively.

* * * * *